(12) United States Patent
Siegenthaler

(10) Patent No.: US 9,488,388 B1
(45) Date of Patent: Nov. 8, 2016

(54) OPTIMIZING THE EFFICIENCY AND ENERGY USAGE OF A GEOTHERMAL MULTIPLE HEAT PUMP SYSTEM

(71) Applicant: John Siegenthaler, Holland Patent, NY (US)

(72) Inventor: John Siegenthaler, Holland Patent, NY (US)

( * ) Notice: Subject to any disclaimer, the term of this patent is extended or adjusted under 35 U.S.C. 154(b) by 167 days.

(21) Appl. No.: 14/088,089

(22) Filed: Nov. 22, 2013

Related U.S. Application Data

(63) Continuation of application No. 12/947,342, filed on Nov. 16, 2010, now abandoned.

(60) Provisional application No. 61/262,030, filed on Nov. 17, 2009.

(51) Int. Cl.
  *F24J 3/08* (2006.01)
  *F24D 11/00* (2006.01)

(52) U.S. Cl.
  CPC ...... *F24J 3/08* (2013.01); *F24J 3/081* (2013.01); *F24D 11/004* (2013.01); *F24J 2003/089* (2013.01); *F25B 2500/19* (2013.01); *F25B 2600/13* (2013.01); *Y02B 30/745* (2013.01); *Y02E 10/12* (2013.01)

(58) Field of Classification Search
  CPC ........ F24J 2003/089; F24J 3/081; F24J 3/08; F24D 11/004; F25B 2500/19; F25B 2600/13; Y02B 30/745; Y02B 10/12
  See application file for complete search history.

(56) References Cited

U.S. PATENT DOCUMENTS

| | | | | |
|---|---|---|---|---|
| 6,073,448 A * | 6/2000 | Lozada | ............... | F03G 7/04 60/641.1 |
| 6,585,047 B2 * | 7/2003 | McClung, III | ......... | E21B 17/01 166/302 |
| 6,688,129 B2 * | 2/2004 | Ace | ............... | F24F 5/0046 137/563 |
| 6,976,524 B2 * | 12/2005 | Walsh | ............... | F24F 3/06 165/63 |
| 7,117,888 B2 | 10/2006 | Niekolaas | | |
| 7,377,122 B2 | 5/2008 | Kidwell | | |
| 7,597,138 B1 | 10/2009 | Koenig | | |
| 7,647,773 B1 | 1/2010 | Koenig | | |
| 7,669,593 B2 | 3/2010 | Blackmon | | |
| 7,992,403 B2 | 8/2011 | Kim et al. | | |
| 2009/0139513 A1 * | 6/2009 | Davis | ............... | F24D 11/003 126/615 |

(Continued)

OTHER PUBLICATIONS

"Geothermal Heat Pump Design Manual," Application Guide AG 31-008, McQuay International 2002.

(Continued)

*Primary Examiner* — Allen Flanigan
*Assistant Examiner* — Filip Zec
(74) *Attorney, Agent, or Firm* — Barry G Magidoff; Paul J Sutton

(57) ABSTRACT

A method for operating a geothermal system is provided to optimize heat exchange between a geothermal loop and a heat pump load loop. The flow through the earth loop is adjusted to meet current thermal demand of a heat pump array, so as to reduce the electrical demand of the earth loop circulator when heat pump thermal demand is low. The speed of the earthloop circulator adjusts to meet the operating conditions of the heat pumps and earth loop, thereby permitting efficient laminar flow whenever possible, as long as thermal demand is met.

Specifically, if flow in the earth loop transitions from turbulent to laminar, this method insures that the current thermal demand of the heat pumps is met, and if not, increases the earth loop circulator speed to meet current thermal demand, otherwise maintaining laminar flow.

3 Claims, 6 Drawing Sheets

(56) References Cited

U.S. PATENT DOCUMENTS

2010/0189572 A1  7/2010  Hansen
2012/0067300 A1  3/2012  Berrio

OTHER PUBLICATIONS

"Siegenthaler to Discuss Renewable Energy Technology," Aug. 3, 2009, BNP Media, Geothermal Heat Pump System Design.

Commercial Geothermal Heat Pump Systems (Part One) by John Siegenthaler, P.E., May 1, 2009, BNP Media.

Commercial Geothermal Heat Pump Systems (Part Two) by John Siegenthaler, P.E., Sep. 1, 2009, BNP Media.

Caleffi Hydronic Solutions Presents Hydraulic Separation Beyond Primary/Secondary Piping, 2007 Webinar Series, Modern Engineering Concepts for Hydronic Heating Design by PM Engineer, presented by John Siegenthaler, P.E., Oct. 2007.

"Flow Near the Outlet of a Geothermal Energy Reservoir," LA-7906-T UC-66A Thesis issued Jul. 1979 by Hugh Donald Murphy, Los Alamos Scientific Laboratory, University of California, pp. cover-140.

"Flow Near the Outlet of a Geothermal Energy Reservoir," LA-7906-T UC-66A Thesis issued Jul. 1979 by Hugh Donald Murphy, Los Alamos Scientific Laboratory, University of California, pp. 141-262.

"Ground-Source Heat Pumps: Design of Geothermal Systems for Commercial and Institutional Buildings" by Stephen P. Kavanaugh and Kevin Rafferty, American Society of Heating, Refrigerating and Air-Conditioning Engineers, Inc., Chapter 5—Pumps and Piping for Ground-Coupled Heat Pumps, 1997.

"GeoThermal: Bringing Comfort to Your World, Working With It: Selecting, Loop Pumps, Alliant Energy," 2002.

"Commercial Applications for Hydronic Geothermal Heat Pumps," by John Siegenthaler, P.E., Jul. 9, 2007, BNP Media.

"Submittal Data Information Hydro-sep," Oct. 5, 2009, Taco, Inc.

"Sep. 2007: Rediscovering Hydraulic Separation," by John Siegenthaler, P.E., Sep. 11, 2007, BNP Media.

Caleffi Hydronic Solutions; idronics journal of design innovation for hydronic professionals; Jul. 2010.

* cited by examiner $$T_2 = \left[\frac{(Q_2 - Q_1)T_2 + (Q_2)T_1}{Q}\right]$$

$$T_4 = \left[\frac{(Q_1 - Q_2)T_1 + (Q_3)T_3}{Q}\right]$$

Q Primary = Q Secondary

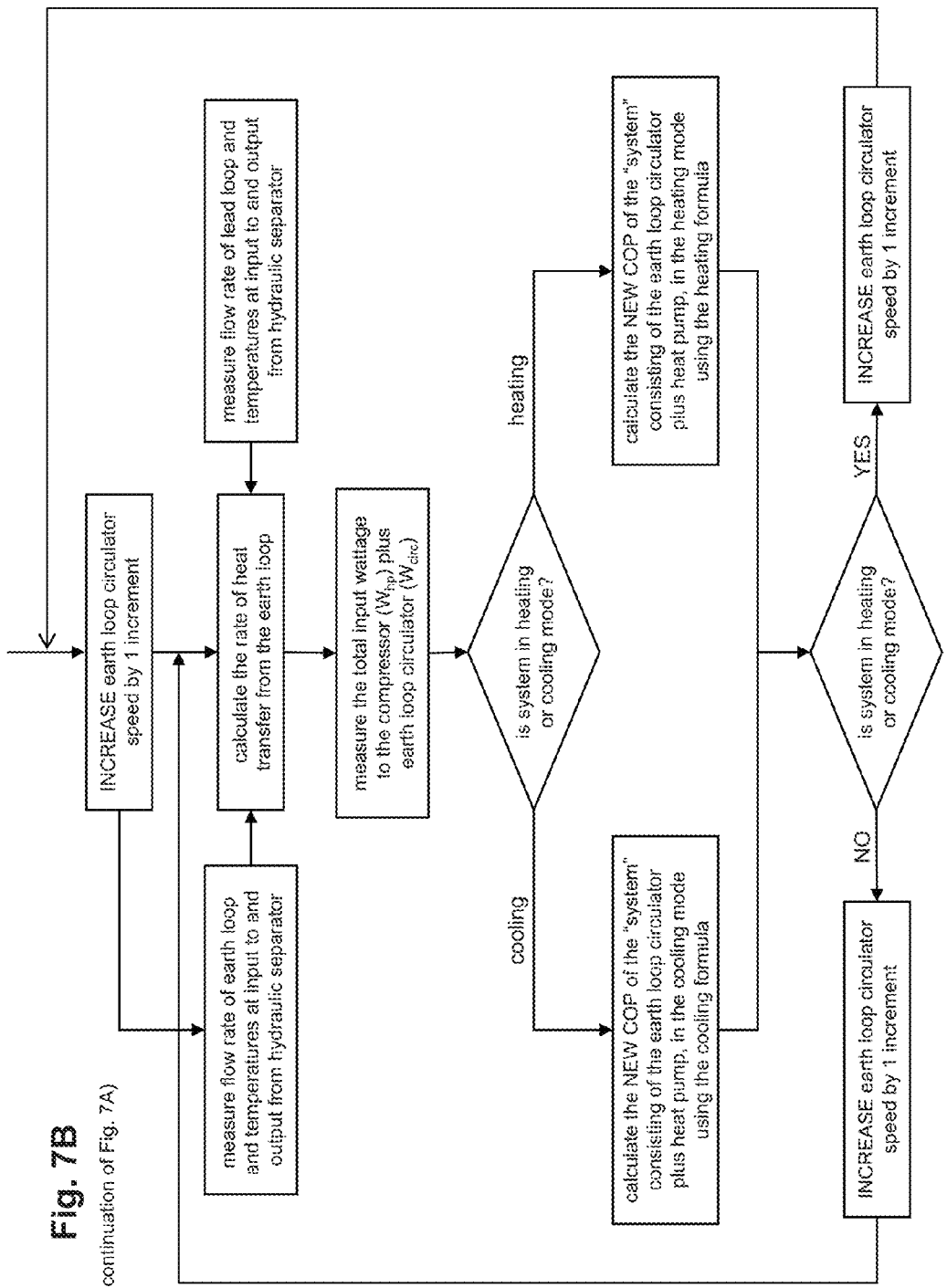

United States Patent US 9,488,388 B1

OPTIMIZING THE EFFICIENCY AND ENERGY USAGE OF A GEOTHERMAL MULTIPLE HEAT PUMP SYSTEM

This application is a continuation application of U.S. patent application Ser. No. 12/947,342, filed on Nov. 16, 2010, now abandoned, which application claims the benefit of priority pursuant to 35 U.S.C. 119(e) from the U.S. provisional patent application having Application No. 61/262,030, filed on Nov. 17, 2009.

BACKGROUND OF THE INVENTION

It is well-known to provide geothermal sources for systems of heat pumps for the heating or cooling of residential, commercial or industrial buildings. It has generally been assumed that the ground loop circulation remains constant even when used with multiple heat pump systems, where there can be widely varying energy requirements depending upon the number of heat pumps operating at any given time. For example, many office buildings are substantially empty overnight, so that the heat pumps maintained in operation during that period may vary by as much as a factor of 5, or more, as compared to the heat pumps operated during a business day. At times of low heat pump operation, the operation of the geothermal loop was inefficient in the sense that unnecessary energy was being expended in maintaining constant flow through the geothermal loop. The prior art believed either that it was necessary to maintain a high flow through the ground loop in order to maintain turbulent flow; although some workers believed that the primary limiting parameter for geothermal heat flow was the low heat transfer rate through the plastic piping usually used. Therefore, existing geothermal multiple heat pump systems provide no means of reducing the electrical demand of the earth loop circulator when a multiple heat pump array is operating at less than fill capacity.

BRIEF SUMMARY OF THE INVENTION

The present invention broadly provides an operating geothermal heat pump system that allows the operator to optimize the efficiency of the overall system by allowing variation of the earth loop flow rate depending upon the load requirements of, e.g., a single variable heat pump system or a multiple heat pump load loop, while optimizing circulator speed control in a multiple geothermal heat pump system. The system controlled in accordance with this invention avoids any problems that may be caused by slowing the circulators so that laminar flow results in the geothermal, or earth loop. The present invention comprises a system, and a method of operating the system, that allows for the optimization of the Coefficient of Performance of the system by permitting continuous variation of the earth loop flow rate as needed to balance the load requirement from the heat pump loop side of the system. Furthermore, where the flow rates for each of the two loops can be varied independently of each other as conditions change, i.e., where there are separate circulators for each of the earth loop and the heat pump loop. This invention provides a system that avoids any problem that may arise from low instantaneous heat transfer rate during laminar flow in the earth loop.

In accordance with the present invention, an efficiently arranged automated, hardware system, programmed to follow an operating algorithm for controlling the hardware system, is provided which allows for the optimization of earth loop circulator speed control in a geothermal heat pump system. One preferred embodiment of the hardware of the system includes a direct heat exchanger providing the interface separating the two loops, where the load loop most preferably includes multiple heat pumps, including a separate circulator on the load side. An indirect heat exchanger could be used, in order to keep the fluid in the two loops completely separate, when necessary due to the sensitivity usually in the load, e.g., heat pump, loop with respect to the fluid in the earth loop. However, direct heat exchange as provided by, e.g., a hydraulic separator, is preferred.

The hydraulic separator interconnects fluid flow through the two loops, but allows for separate independent, unlimited fluid flow adjustments of the ground loop flow and the heat pump, or load, loop flow, in order to accommodate large changes in the heat exchange rate required for the load loop while maintaining complete and effective heat exchange between the two loops; for example, where multiple heat pumps are provided in a single building or group of buildings, and all or only one of the heat pumps may be operating at any given time; depending upon the needs of the building's occupants, the heat requirement of the load loop may be 20% or less than that required at full operation. The hydraulic separator provides a volume for mixing and heat exchange of the liquid flowing through the two loops with minimal pressure loss, while permitting independently setting the flow rate through each loop. The hydraulic separator also provides the added benefit of optimally providing for the removal of air bubbles and any suspended particulate material, and thus prevent buildup of these impurities, which could compromise the efficient, long term operation of the heat pump system.

In another preferred embodiment, especially useful where only a single heat pump is present, there can be direct flow through the two loops, without any intermediate interface. However, in this circumstance, the automated system provides for the optimization of the entire system, based upon the energy usage of, or input to, the earthloop circulator and the energy output from the heat pump system.

Many suppliers manufacture specially arranged hydraulic separators, which also may contain coalescing medium to assist in the removal of air microbubbles and suspended solid particles. Alternatively, a similar effect is obtainable by the use of a wide diameter vertical header, having centrally located along the length of the header a pair of closely spaced T's.

The present invention also provides for a compact, prepackaged control and heat exchange module, that can be attached between an earth loop and a heat pump load loop, by readily available commercial pipe connections. The compact hardware package of this invention preferably comprises an inter loop-direct heat exchanger, such as the preferred hydraulic separator; piping connections for connecting the two sides of the, e.g., hydraulic separator, to the loops; a ground loop variable flow circulator, operatively connected to and controllable by a data controller, and in fluid flow connection with the inlet or outlet from the ground loop side of the inter loop-direct heat exchanger, e.g., the hydraulic separator. Optionally, a load loop circulator, in fluid flow connection with the inlet or outlet from the load loop side of the inter loop-heat exchanger, can be especially useful where there are a plurality of heat pumps in the load loop. A digital data controller for the monitoring and controlling of the operation of the geothermal heat pump system is provided, along with two sets of temperature sensors, operatively connected to the data controller, one set of temperature sensors being operatively connected to each of the inlet to and outlet from the an interloop direct heat exchanger, e.g., a hydraulic separator, for each of the earth-loop flow system and the load loop flow system, respectively, for measuring the temperature of the fluid in the loops at each location. There are also provided two flow rate sensors, such as flow rate transducers, one located immediately upstream or downstream from the hydraulic separator in the connections to each of the load loop and ground loop, respectively, for measuring the flow of fluid through each loop, and watt transducers for continually measuring the power being used by the two loop circulators and the heat pumps, all of these sensors and monitors being operatively connected to the data controller, provide their respective data to the data controller on a continual, real time basis.

This compact package can efficiently and effectively monitor and control the two loops and optimize the efficiency of the system in accordance with the method of the present invention. The data controller continuously receives temperature and flow rate data from each of the temperature sensors and flow rate transducers, and power usage from each watt transducer, to compute the instantaneous heat exchange rate for each loop, and the power usage of the system, and thus the Coefficient of Performance ("COP") of the system. By varying the speed of the ground loop circulator in accordance with the heat flow requirements of the load loop fluid, it can maintain the required temperatures in the load loop system while optimizing the energy use efficiency (COP) of the overall system.

By measuring the electric usage of the heat pumps and the heat pump circulator(s) and of the ground loop circulator(s), the data controller can determine the power usage efficiency of the overall operation of the system, as the heat pump load varies during the day or in accordance with changing external factors.

In accordance with the method of this invention, the digital data controller is programmed to use the data provided by the several sensors and transducers to operate the geothermal heat pump system in accordance with the algorithm of this invention, so as to optimize the Coefficient of Performance ("COP") of the overall system, and to optimize the respective flow rates of each of the ground loop and load loop to achieve the most effective heat exchange rates and operating conditions. By allowing for the operation of the ground loop at laminar flow conditions, even for short periods of time, the total energy usage by the circulators, and therefore the overall efficiency of the system is improved.

The method of this invention is represented by algorithms programmed into the data controller. The method of this invention provides for balancing the instantaneous heat exchange rate between the two loops by varying the speed of the ground loop circulator in response to changes in the required instantaneous heat exchange rate for the load loop so as to control the fluid flow rates of the ground loop in order to optimize the overall efficiency; by modifying the energy usages of the two loops so as to reduce the total energy usage, overall efficiency is improved.

Most significantly, when operating a multiple heat pump system in a single building, sharp changes in energy requirements often occur in the operation of the system, such as when one or more of the heat pumps in the loop will change status, i.e., between being on and being off, in response to conditions or requirements in the building.

DETAILED DESCRIPTION OF THE INVENTION

Figure 1:
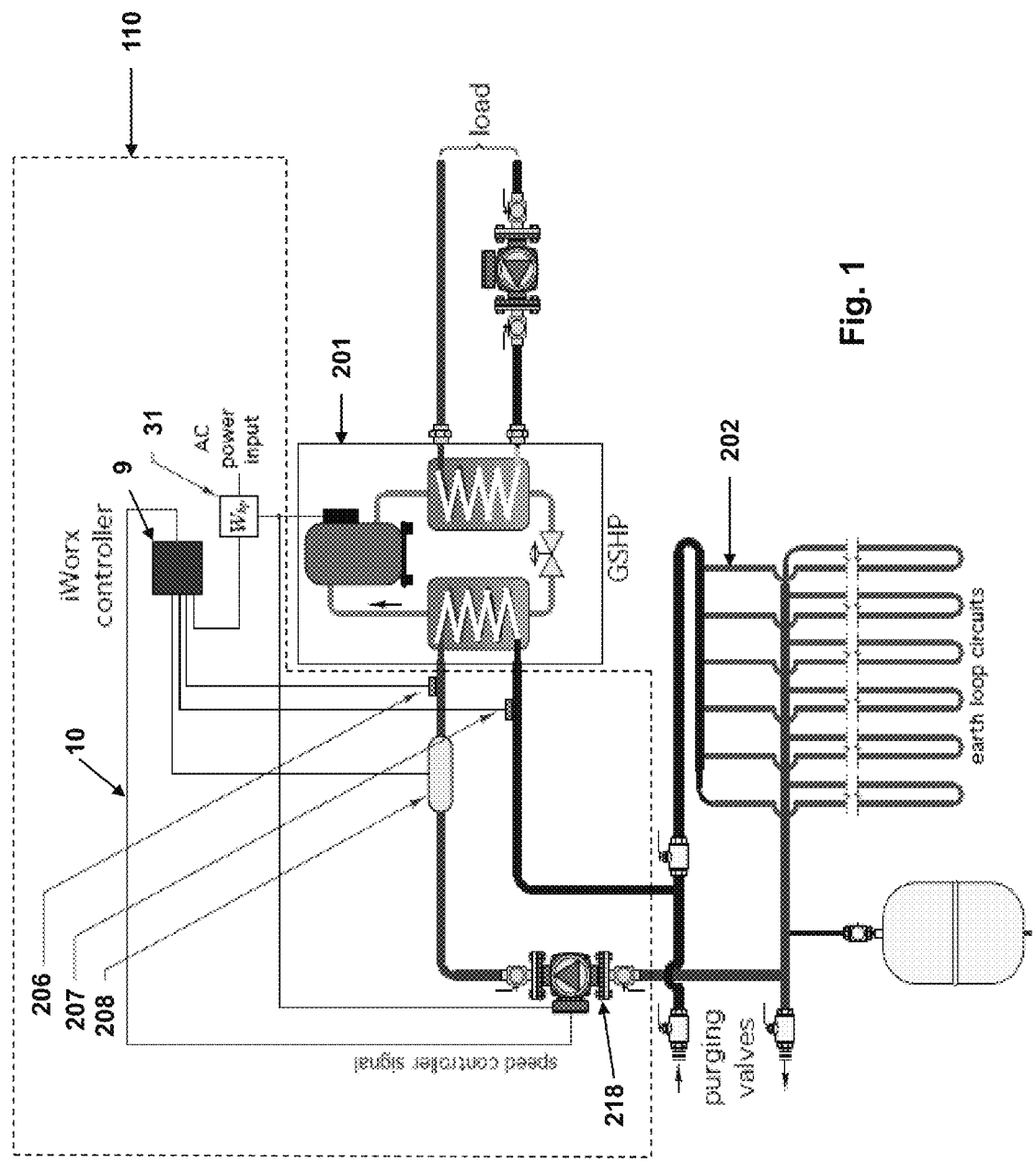
FIG. 1 depicts an example of suitable system hardware for carrying out a preferred method of the present invention for a single heat pump system.
Figure 2:
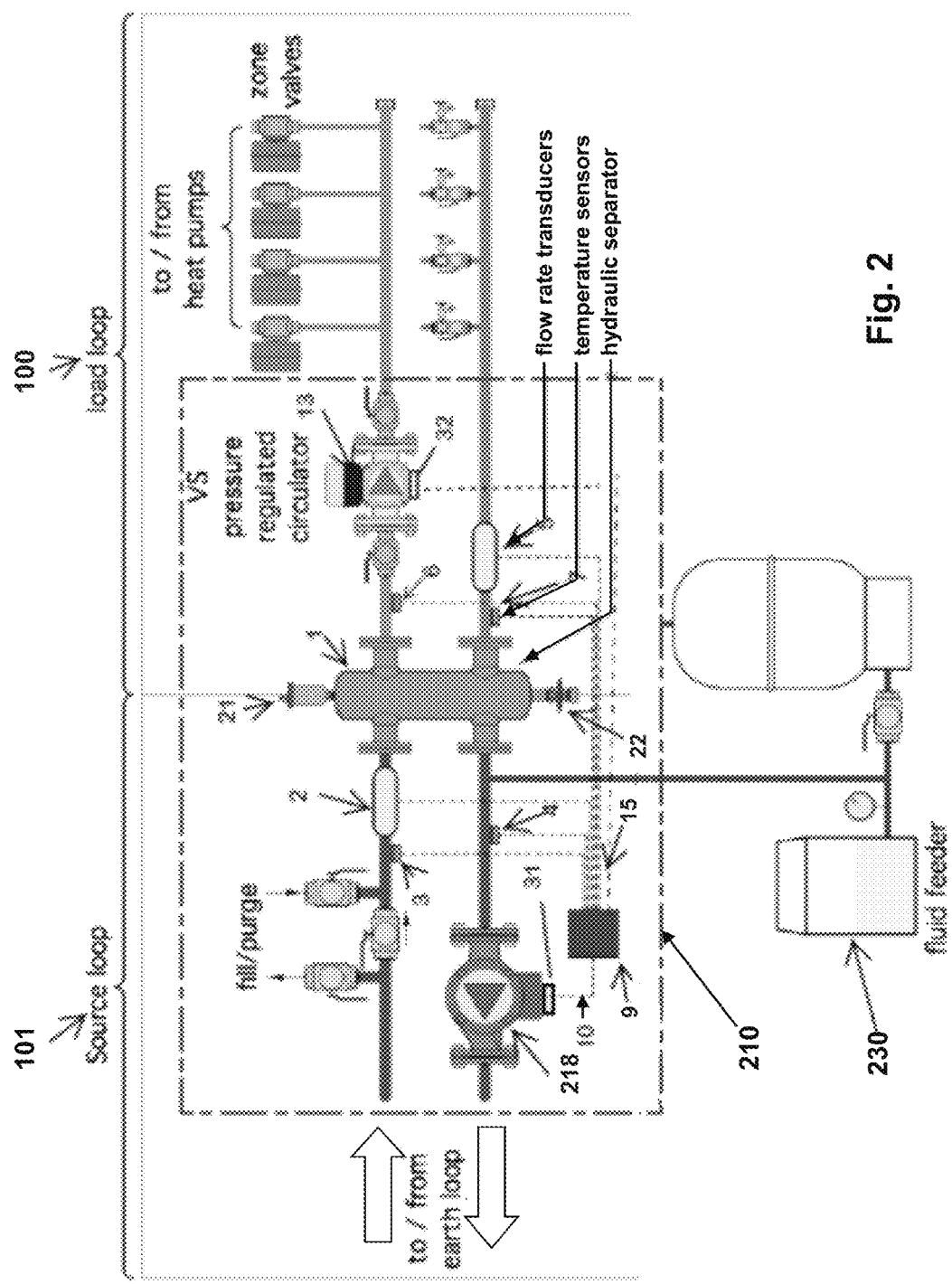
FIG. 2 depicts an example of suitable system hardware for carrying out a preferred method of the present invention for a multi-heat pump system.
Figure 4:
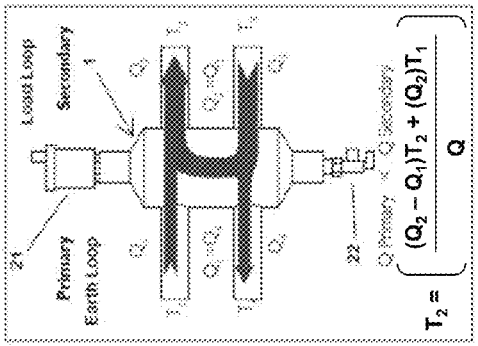
FIGS. 3-5 depict operation of an exemplary hydraulic separator under different relative flows through the Primary (ground) loop and Secondary (load loop)
Figure 5:
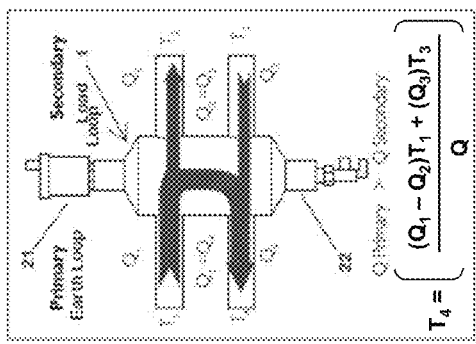
Figure 3:
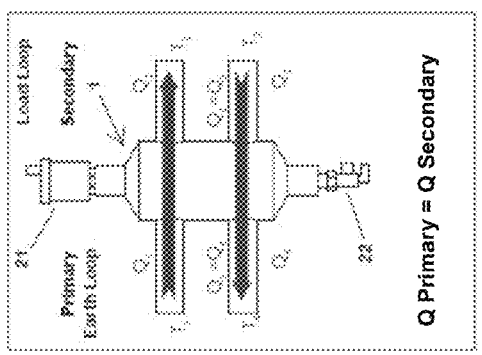
Figure 6:
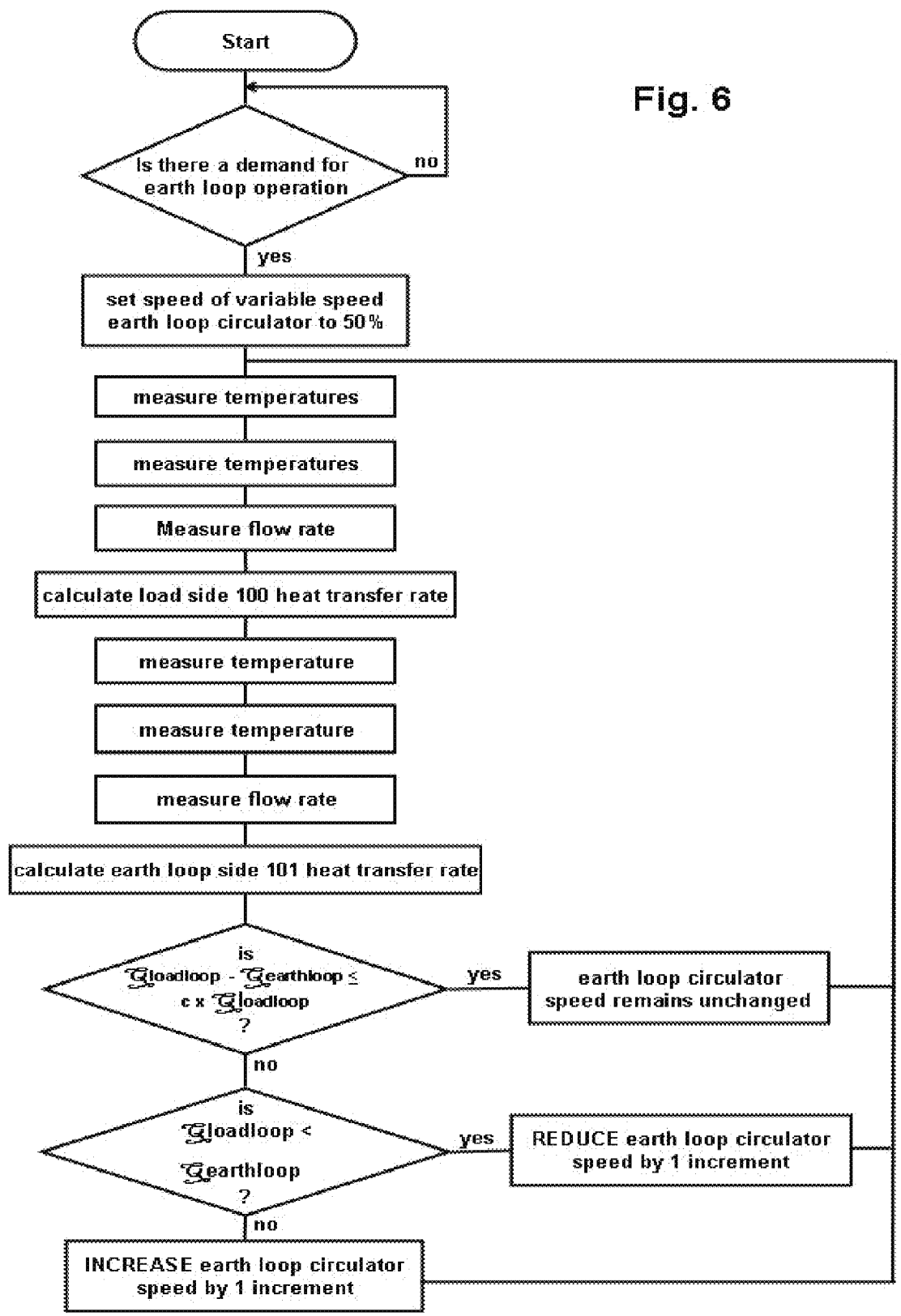
FIG. 6 depicts a flow chart for the algorithm representing the operation of, and the flow through, the system in accordance with this invention where it is desired to optimize COP, in either a single or multiple heat pump system.

The operation of systems of this invention, in accordance with the general depictions of FIGS. 1 and 2, is preferably carried out using a digital controller 9, programmed in accordance with the algorithms represented by the flow charts of FIGS. 6 and 7, respectively. The program comprises a series of mathematical equations that are used to calculate the various parameters of the system, based upon data received by the controller 9 from the several sensors, and pre-entered information, such as the known properties of the circulating fluid, e.g., its specific heat and density. The data received provide the bases for controlling the earth loop circulator 8, by optimizing the flow through the earth loop 101, which tends to enhance the coefficient of performance (COP) of the overall system, and to maintain the instantaneous rate of heat transfer ($Q_{earthloop}$) on the earth, or Source, loop side 101 of the hydraulic separator 1, at a value not less than the heat transfer ($Q_{output}$) for the load loop side 100. The central compact system for achieving these results is exemplified by the portion of each of FIGS. 1 and 2, outlined by the broken lines, and designated by the numerals 210, 110, respectively.

The preferred compact, pre-packaged control and heat exchange module, of the present invention, as depicted in FIG. 2, preferably comprises a hydraulic separator, designated generally by the numeral 1, most preferably including an air separator vent 21 and a coalescing medium, such as Pall rings, in the body of the separator. The use of a coalescing medium reduces the potential for gaseous cavitation by the elimination of air microbubbles from the liquid in the two loops as the liquid passes through the hydraulic separator, and by helping to remove micro particles of solids that might create blockages elsewhere in the system, if not removed.

The hydraulic separator 1 also preferably provides at the opposite, lower, end a trap 22 for the removal of coalesced solid material passing through the hydraulic separator 1. This is especially important in the system of the type shown in FIGS. 1 and 2, where the same liquid is passed through the source loop 101 and through the heat pump load loop 100. Useful coalescing media include such commercially available materials as Pall rings, in an available Taco 4900 hydraulic separator, or the coalescing media-contained in the 5900 FlexBalance and 5900 FlexBalancePlus hydraulic separators, all from Taco, Inc.

The compact control and heat exchange module 210 further includes the variable flow ground loop circulator 8 and the heat pump loop circulator 13, and all necessary piping, valving, and control components, as well as the necessary fluid flow line connection points for the external portions of each loop, including, for example, to the ground loop and the heat pump load loop, as well as to any expansion tank and fluid feeder, on the ground loop side of the hydraulic separator. Such a module, which can be packaged by a manufacturer, eliminates any onsite problems of circulator sizing, sensor placement, wiring, and pipe sizing, as such a pre-fabricated module can be specified by the design engineer as the complete interface between the earth loop mains and the mains of the heat pump load loop. The pre-fabricated module would be manufactured for a specific performance range, dependent upon the requirements of the load loop.

Most preferably, the hydraulic separator is sized, in conformity with its anticipated use and the capacity of the circulators, so that the maximum flow speed through the hydraulic separator body is not greater than about 4 ft/sec.

As shown in FIG. 2, this modular system further includes the data controller 9, the temperature sensors 3, 4, 6 and 7, the flow rate sensors 2 and 5 and one or two watt transducers 31 and 32, for measuring the power to the ground loop circulator and the primary heat pump circulator, respectively; all of these sensors and data providers usually being transducers. The sensors and transducers preferably report the data digitally, either through wired connections, especially in the packaged module, or wirelessly, using for example BLUETOOTH technology. A suitable data compiler and controller is the IWORX platform, from Taco, Inc., which is networkable, and can thus be used to operate and balance several systems in different building locations. This can be significant where it is desired to save overall electrical usage, especially in locations where the total amount of electricity available to an enterprise may be limited in high use times, by increased utility rates. It can also be effective where there are several different systems operating in the same building with competing or complementary effects.

In addition, FIG. 2 includes a representation (in dotted lines) of the wiring connections, identified by the numeral 15, between the sensors and the data controller 9, and the control line 10 from the data controller 9, for controlling the earth loop circulator in accordance with the algorithms of this invention. It should be understood that the operating connections between the sensors and the earth loop circulator and the data controller can be wireless, for example using BLUETOOTH technology. However, when the system is manufactured as a prefabricated compact module, wireless connections would likely be an unnecessary added expense, except if it is desired to also control the load side controller, which can be hard-wired or connected wirelessly by, e.g., BLUETOOTH.

In accordance with the algorithm of this invention, and as shown in the flow chart of FIG. 6, when the data controller 9 receives a signal that the building requires heating or cooling the heat pump circulator 13 and the earth loop circulator 8 are started. The earth loop circulator 8 is preferably initially started at 50% speed, and the data from the several data collecting devices, i.e., the four temperature sensors 3,4,6,7, the two flow rate transducers 2,5, and the energy usage of the circulators 8,13, from the watt transducers 31,32, are received by the data controller 9 (which can be, for example, a Taco IWORX networkable monitoring and controller platform).

When the system is operating, the hydraulic separator 1 allows for independently variable flow rates through the earth loop and the load loop, which comprises a multiple heat pump array. In addition, the hydraulic separator allows for high performance, continuous microbubble air separation, in both source loop and load loop, which allows for more efficient circulator operation and greatly reduces the potential for gaseous cavitation. Conventional practice in smaller ground source heat pump systems is not to provide any air separation in the earth loop. Larger commercial systems may include air separators in the earth loop, but these are often vortex separators that are not as efficient in gathering microbubbles as would be a hydraulic separator equipped with microbubble coalescing media (an example of such hardware is the Taco 4900 hydraulic separator using Pall ring coalescing media). The use of Pall rings and other coalescing media is well-known in the art and by itself does not form part of this invention.

The hydraulic separator also allows for high performance and continuous dirt separation in both the earth loop and load loop. Given that much of the earth loop piping is joined in open excavations, there is increased potential of dirt getting into piping during installation. Conventional practice is to "purge" earth loop piping at initial startup, but this short duration process may not remove fine particles held in suspension, or those clinging to inner surfaces of piping. Continuous dirt separation would eventually capture this foreign material and allow it to be easily removed from the system. (Again, a suitable example of such hardware are the Taco 4900 or 5900 hydraulic separator, using Pall ring or other coalescing media, useful for both gas and solid coalescence.)

The load loop side 100 flow sensor 5 and two temperature sensors 6,7 provide the data needed to calculate the instantaneous rate of heat transfer required by the current operating condition of a multiple geothermal heat pump array, for the load side of the hydraulic separator. Similarly, the earth loop flow sensor 2 and the two temperature sensors 3,4 provide the data needed to calculate the instantaneous rate of heat transfer delivered from the earth loop. Signals from the flow sensors 2,5 and two pairs of temperature sensors 3,4 and 6,7 are acquired and processed by the data controller 9, so that the controller 9 can compute the instructions to the earth loop circulator 8 to speed up or slow down, depending upon whether the rate of heat transfer on the load side is greater or less than the rate on the earth loop side. The load side circulator 13 may be either variable speed or fixed speed.

It should be understood that this system can be used for any large heat source or sink system in addition to an underground heat exchange loop, such as a lake or other large body of surface water.

As an example of hardware suitable to act as the electronic controller is the Taco IWORX Control Platform, from Taco, Inc. During operation of the system, the data controller is programmed to continually compare the instantaneous rate of heat transfer on the load side of the hydraulic separator to the instantaneous rate of heat transfer on the earth loop side of the hydraulic separator.

In the system of FIG. 2, if the instantaneous rate of heat transfer on the earth loop side 101 of the hydraulic separator 21 is less than the instantaneous rate of heat transfer on the load loop side 101 of the hydraulic separator 1, the speed of the earth loop circulator 2 is increased, incrementally, as necessary, until these rates of heat transfer are equalized or it is greater on the earth loop side 100.

If the instantaneous rate of heat transfer on the earth loop side 101 of the hydraulic separator 1 is greater than the instantaneous rate of heat transfer on the load side 100 of the hydraulic separator 1, the data controller 9 signals the earth loop circulator 8 to incrementally reduce the flow rate through the earth loop side 101 until it equalizes these heat transfer rates.

By carrying out the algorithm illustrated by FIG. 6, the system of FIG. 2 can be operated so as to maintain a substantially equal instantaneous heat flow in the two loops, i.e., on both sides of the hydraulic separator, and this allows reducing the flow through the earth loop to the greatest degree feasible, including dropping down to laminar flow rates, and thus conserving a significant amount of energy. Although continuously maintaining exactly equal flow rates may not be practical, by maintaining a small±ΔQ between the two loops, the same result can be achieved.

Determine the instantaneous rate of heat transfer from the earth loop using ΔT and flow rate as follows:

$$Q_{earthloop} = (8.01 \times D_{earthloop} \times c_{earthloop}) \times f_{earthloop} \times (T_{earthloopin} - T_{earthloopout})$$

$Q_{earthloop}$ instantaneous rate of heat transfer on earth loop side of hydraulic separator (Btu/hr)

D is the density of the fluid flowing through the loops (lb/ft³);

c is specific heat of the fluid in the loops (Btu/lb/° F.);

$f_{earthloop}$ is the fluid flow rate in the indicated loop (gallons/minute);

T is the temperature (° F.) at the inlet to, or the outlet from, the hydraulic separator in the indicated loop; and 8.01 is a units constant.

Similarly, the layout as shown in FIG. 2, allows the operator to determine the instantaneous rate of heat transfer in the load loop using ΔT and flow rate on the load loop side of the hydraulic separator, as follows:

$$Q_{loadloop} = (8.01 \times D_{loadloop} \times c_{loadloop}) \times f_{loadloop} \times (T_{loadloopin} - T_{loadloopout})$$

$Q_{loadloop}$=instantaneous rate of heat transfer to load side of hydraulic separator (Btu/hr);

D is the density of the fluid flowing through the loops (lb/ft³);

c is the specific heat of the fluid in the loops (Btu/lb/° F.);

$f_{loadloop}$ is the fluid flow rate in the load loop (gallons/minute);

T is the temperature (° F.) at the inlet to, or the outlet from, the hydraulic separator in the load loop; and 8.01 is a units constant.

As shown in FIG. 6, by continually testing the equality of $Q_{loadloop}$ and $Q_{earthloop}$, and raising and lowering the flow through the earthloop, a highly efficient heat exchange operation can be carried out.

The optimum heat pump performance occurs when the ratio of the desired output (heating or cooling capacity), divided by the total input power to operate the system is maximized. The ratio is called the system COP, or Coefficient of Performance. This is most easily shown in the single heat pump system of FIG. 1. In this system, the temperature of the fluid flowing into and away from the heat pump, designated by the numeral 210, is measured by the two temperature sensors 206,207, and the flow rate is measured by the flow transducer 216.

The optimum heat pump performance occurs when the ratio of the desired output (heating or cooling capacity), divided by the total input power to operate the system, is maximized. The ratio is called the system COP. The total input power is the electrical wattage to operate the heat pump(s) and the earth loop circulator.

The total input power is the electrical wattage to operate the earth loop circulator 218 plus the power to operate the heat pump 202. Heat rate measurement on the earth loop side 201 of the SINGLE water-to-water or water-to-air heat pump, could be used to vary the earth loop circulator speed and track the maximum system COP. This is analogous to maximum power point tracking used by inverters in photovoltaic systems. The goal is to vary the flow rate within the earth loop 201, so that maximum system COP is always maintained, while maintaining the necessary instantaneous rate of heat transfer on the earth loop side 201.

Figure 7A:
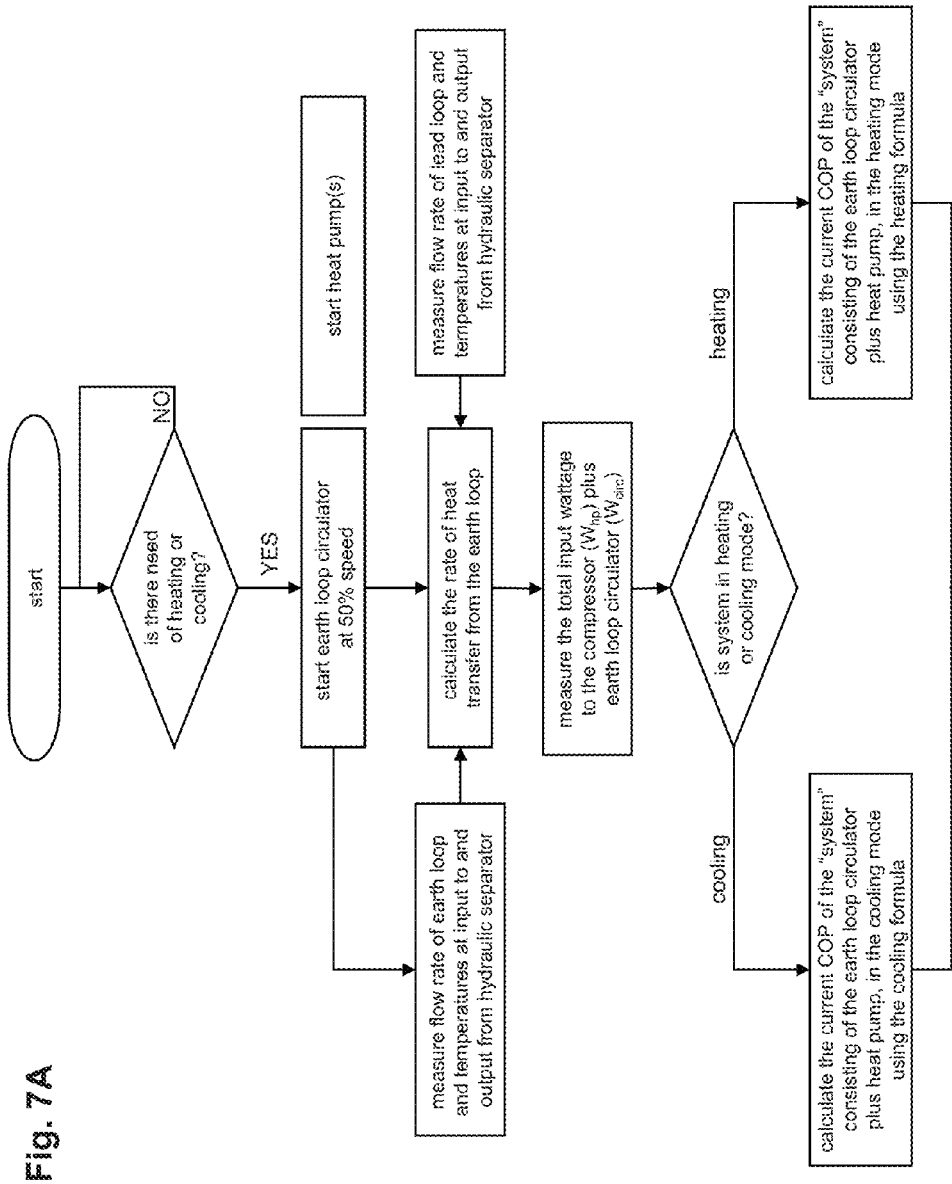
FIGS. 7A/7B depict a flow chart for the algorithm representing the operation of, and the flow through, the system in accordance with this invention where it is desired to optimize heat exchange and flow rate through each of the two loops, in a heat pump system where the two loops are separated by an interloop direct heat exchanger.

The following computation procedure would apply in the heating mode for the directly heated system of FIG. 1, following the algorithm illustrated by FIGS. 7A/7B:

To determine the COP of the system, measurements are taken of the total input wattage to the heat pump (Whp), and to the earth loop circulator (Wcirc). Depending upon the wiring to the circulators and compressors, this can require one or more watt transducers 31,32. Where the heat pumps are used for cooling, it is necessary to measure the wattage to each circulator individually.

The heating output of the heat pump (either water-to-water or water-to-air) can be calculated by the energy balance:

$$Q_{output} = Q_{earthloop} + (W_{hp} \times 3.413)$$

Where 3.413 is a constant for this type of system.

The COP of the "system" consisting of the earth loop circulator loop plus heat pump loop, in the heating mode, can be calculated as follows:

$$COP_{heating} = (Q_{earthloop} + (W_{circ} + W_{hp}) \times 3.413) / ((W_{circ} + W_{hp}) \times 3.413)$$

The COP of the "system" consisting of the earth loop circulator plus heat pump, in the cooling mode, can be calculated as follows:

$$COP_{cooling} = (Q_{earthloop} - (W_{circ} + W_{hp}) \times 3.413) / ((W_{circ} + W_{hp}) \times 3.413)$$

In both of the above formulae, for $Q_{earthloop}$, it is assumed that the wattage [$W_{hp}$] to operate the heat pump is ultimately converted to heat and dissipated into the heated space.

As shown in the flow chart of FIGS. 7A/B, when the heat pump first starts, the earth loop circulator 218 should be operated at 50% of full speed. After a stabilization period of perhaps 1 minute, if readout from the controller 9 of the $Q_{earthloop}$ is greater than the $Q_{loadloop}$, incrementally reduce the earth loop circulator speed and recalculate the system COP. If the system COP is higher than before, repeat the incremental reductions of earth loop circulator speed, each time calculating the new system COP. If a drop in system COP occurs upon a drop in circulator speed, incrementally increase the earth loop circulator 218 speed and recalculate the system COP. Move the pump speed in the direction that continually maximizes the system COP. This series of operations is carried out automatically by the data controller, which calculates the COP and then controls the earthloop circulator 218 to increase or decrease flow, as required by these equations.

Although published performance data make clear that the COP of the heat pump circulator decreases upon a drop in earth loop flow rate, a corresponding, or greater, drop in input watts to the earth loop circulator 8, could result in the system COP remaining the same or increasing. When desired, the COP of the multi heat pump system of FIG. 2 can be calculated by the total energy usage on the load loop side of the, e.g., hydraulic separator.

The instrumentation shown in FIG. 1, provides the controller 9 (e.g., an IWORX Platform) with data to compute and log the COP of the heat pump(s) only, as well as the COP of the overall system (heat pump(s)+earth loop circulator), and to output a speed regulation signal to the earth loop circulator 218 responsive to the need to meet the instantaneous rate of heat transfer of the load loop so as to maximize the system COP. The earth loop circulator 218 is selected to be one capable of operating at variable speeds in response to a control signal issued by the electronic controller 9. A suitable commercially available example is a Taco 2400-70 High Capacity Circulator, from Taco, Inc.

The load loop circulator 13, in FIG. 2, can be a pressure regulated circulator sensitive to the flow requirements of the heat pumps, i.e., the number of such heat pumps operating and the level of operation of the operating array. Therefore, the flow on the load loop side is defined only by the requirements of the operating heat pumps.

The hydraulic separator 1 allows independent flow rates through the earth loop and the hydronic load, i.e., heat pumps, circuit supplying the multiple heat pump array of FIG. 2, while maintaining continuing flow through each loop with full direct heat exchange between the two loops.

Flow measurement is obtained from a flow sensor 2 at the earthloop inlet to the hydraulic separator 1 and from a flow sensor 5 at the load loop inlet to the hydraulic separator 1; both flow sensors 2, 5 measure the instantaneous rate of fluid flow into the hydraulic separator 1 from its respective flow loop.

Similarly, temperature measurements are obtained at both the inlets to and outlets from the hydraulic separator 1, on each of the heat pump side and earth loop side of the hydraulic separator 1 utilizing pairs of temperature sensors 3,4 and 6,7.

Heat transfer calculations for each of the heat pump side and earth loop side of the hydraulic separator can thus be made and compared, using the instantaneous flow rate and temperature difference measurements continually streamed to the electronic controller 9 from the respective sensors.

The method and associated hardware of this invention allows a system designer to design the optimal size earth loop circulator based upon the maximum requirements of a particular heat pump array, while allowing for operational optimization of the circulator as the requirements of the heat pump loop changes to varying levels below the maximum operational level.

It must be noted that, in addition to "closed" earth loop systems, this method can be applied to "open loop" geothermal systems that use ground water, or water from a lake, pond, or ocean, as the source water for a multiple heat pump array.

Similarly, this method can also be applied to regulate flow and reduce circulator electrical demand in systems using an atmospheric cooling tower to dissipate heat from a multiple water source heat pump system, or a boiler or other heat source. However, because of the difficulties in dealing with a below ground closed geothermal system, the most effective and preferred use of this invention is in the context of such a closed geothermal loop system.

The method of this invention, measures instantaneous thermal demand (rate of heat transfer) to a multiple heat pump array and compares it to instantaneous thermal supply (rate of heat transfer) from the earth loop. Earth loop circulator speed is continually adjusted as necessary to ensure that the rate of heat transfer from the earth loop matches the rate of heat transfer required by the multiple heat pump array. This method is enhanced and made more efficient by the inclusion of a hydraulic separator between the earth loop and load loop piping circuit serving the heat pump. This is most significant for a multiple heat pump array, where the demand can vary greatly by operating only some of the heat pumps during certain periods.

By monitoring and balancing the rates of thermal energy transfer across the hydraulic separator, i.e., between the earth loop side and the load side, there is assurance that the instantaneous thermal needs of the load loop are met. This method compensates for variations in the number of currently active heat pumps within the load loop, as well as variations in COP (Coefficient of Performance) and heating or cooling capacity of the heat pumps if the geothermal temperature and heat pumps load varies. Most particularly, this method provides stable control if earth loop flow were to transition from turbulent to laminar as the flow rate through the earth loop is varied.

In theory, such a transition would immediately drop the convective heat transfer rate within the earth loop to approximately 7 percent of the rate provided by turbulent flow. This transition would manifest itself as a sudden change in the temperature of fluid returning to the hydraulic separator from the earth loop, the direction depending upon the direction of the heat transfer, i.e., whether the heat pumps are in a heating or cooling mode.

The electronic controller 9, operating under the control algorithm of this invention, would respond by causing an increase in the earth loop flow if necessary to meet the load loop requirements, or, allowing the earth loop to remain in laminar flow if the load requirements are being met. There is no inherent problem with the earth loop remaining in laminar flow provided sufficient heat transfer is being provided to the load loop. The head loss and pressure drop of laminar flow is much less than that produced by turbulent flow, and thus permits very efficient operation of the earth-loop circulator. Thus, provided that the thermal needs of the load loop are being met, operating the earth loop with laminar flow greatly reduces electrical energy use by the earth loop circulator whenever possible, and allows for an increase in overall system efficiency (COP).

Conventional engineering practice now maintains the earth loop flow rate high enough to prevent transition to laminar flow under all circumstances (e.g. maintains Reynolds numbers above 2500 at worst case conditions on a continuous 24/7/365 day schedule, or whenever one or more heat pumps are operating. This adds significantly to pumping power requirements, even though transition conditions may only occur under extreme conditions (e.g., the lowest possible earth loop fluid temperature or when only one or two of many heat pumps are operating, for example overnight in an office building). The proposed method and system could provide significant electrical energy savings by compensating for such conditions as necessary.

A "smart" control subsystem, such as Taco, Inc.'s IWORX platform, allows for both basic control and enhanced monitoring/reporting of the system's performance. By adding watt transducers to measure the electrical wattage supplied to the circulators and heat pumps (or single heat pump, as the case may be in FIG. 1), —it is possible using, e.g., the IWORX platform, to calculate and display the following parameters:

1. Instantaneous system heat output
2. Instantaneous system COP (Coefficient of Performance)
3. Total heat output of multiple heat pump system over a given time
4. Average system COP (Coefficient of Performance) over a given time
5. Instantaneous system chilling capacity
6. Instantaneous system EER (Energy Efficiency Ratio)

7. Total "ton-hours" cooling supplied by heat pump system over a given time

8. Average system EER (Energy Efficiency Ratio) over a given time

These calculated parameters, or indices, could be used to verify system performance relative to theoretical estimated performance. This information could also be use to help diagnose operational problems. By providing networking, either local or through the internet, which is possible with this system, even greater efficiencies are possible.

The above examples and descriptions are intended to be exemplary only. It is understood that the full scope of this invention should be determined only by the scope of the claims set forth below.

The following invention is claimed:

1. A method for efficiently operating a geothermal heat pump system by dynamically optimizing the Coefficient of Performance ("COP") of the system, the geothermal heat pump system comprising a heat pump and an earth flow loop in fluid flow and heat exchange connection with the heat pump; the earth flow loop including an earth flow loop circulator, a temperature sensor at each flow connection between the heat pump and the earth flow loop, and a flow sensor in the earth flow loop, each of the sensors providing a signal output; a watt transducer operably connected to the earth loop circulator and to the heat pump, the watt transducer providing a signal output representing the power provided to each of the earth loop circulator and the heat pump; and a data receiver-and-controller operably connected to the sensors and watt transducer to receive the signal outputs containing the temperature, flow and power usage data, and to provide control to the earth loop circulator in accordance with an algorithm for the data receiver-and-controller providing for iterative calculations for dynamically optimizing COP;

the method comprising:
the data receiver-and-controller continually calculating the Coefficient of Performance ("COP") of the system consisting of the earth loop plus the heat pump, in the heating mode, in accordance with the following equation:

$$COP_{heating}=(Q_{earthloop}+(W_{circ}+W_{hp})\times 3.413)/((W_{circ}+W_{hp})\times 3.413);$$

and continually calculating the COP of the system consisting of the earth loop plus the heat pump loop, when the heat pump is in the cooling mode, in accordance with the following equation:

$$COP_{cooling}=(Q_{earthloop}-(W_{circ}+W_{hp})\times 3.413)/((W_{circ}+W_{hp})\times 3.413);$$

wherein
$Q_{earthloop}$=instantaneous rate of heat transfer on earth loop side of flow interface (Btu/hr);
$W_{circ}$=the total input wattage to the earth loop circulator; and
$W_{hp}$=the total input wattage to the heat pump (Whp);

incrementally reducing the earth loop circulator speed and recalculating the system COP whether in heating or in cooling mode; if the system COP is higher than before the immediately preceding circulator speed reduction, repeat the incremental reduction of the earth loop circulator speed, each time recalculating the new system COP; if an incremental reduction in earth loop circulator speed results in a reduction in system COP as compared to before the immediately preceding circulator speed reduction, incrementally increasing the earth loop circulator speed and recalculating the system COP; the data receiver-and-controller continually carrying out these iterative calculations and speed changes so as to continuously change the earth loop circulator speed in the direction that continually maximizes the system COP thus accounting for any dynamic change in required heat pump output or change in the temperature in the earthloop.

2. A method for efficiently operating a geothermal heat pump system subject to widely varying load requirements, the system comprising two flow loops, a geothermal flow loop and a heat pump load loop, the geothermal heat pump system comprising a geothermal flow loop including an earth loop circulator and a heat pump load loop, comprising multiple independently variable heat pumps and a pressure regulated circulator, such that the earthloop circulator is subject to varying heat transfer rates below the maximum operational level of the heat pump load loop; the two flow loop systems being interconnected for fluid flow and direct heat exchange at a direct flow interface; a temperature sensor at each of the entrance to and exit from the geothermal flow loop and the heat pump load loop, and a flow sensor in each of the flow loops; each of the sensors providing a signal output; and a data-receiver-and-controller operably connected to the sensors to receive the signal outputs containing the temperature and flow data, and to provide control to the earth loop circulator in accordance with an algorithm for balancing the heat transfer rates between the two loops, the direct flow interface between the earth loop and the load loop providing direct flow and heat exchange so as to allow for wide differences in flow rates between the two loops; the method further comprising the continual calculation by the data receiver and controller of the instantaneous rate of heat transfer of each of the geothermal flow loop side and the heat pump load loop side of the flow interface using the fluid flow and temperatures at the inlet to and outlet from each of the heat pump load loop and the geothermal flow loop; in accordance with the following algorithm providing for iterative calculations for causing the instantaneous rate of heat transfer of each of the geothermal flow loop and the heat pump load loop to tend towards equality:

$$Q_{earthloop}=(8.01\times D_{earthloop}\times c_{earthloop})\times f_{earthloop}\times (T_{earthloopin}-T_{earthloopout})$$

$Q_{load}$=instantaneous rate of heat transfer to load side of flow interface (Btu/hr)
$Q_{earthloop}$=instantaneous rate of heat transfer on earth loop side of the flow interface (Btu/hr)
D is the density of the fluid flowing through the loops (lb/ft$^3$);
c is specific heat of the fluid in the loops (Btu/lb/° F.);
f is the fluid flow rate in the indicated loop (gallons/minute);
T is the temperature (° F.) at the inlet to, or the outlet from, the flow interface in the indicated loop; and
8.01 is a units constant; and $$Q_{loadloop}=(8.01\times D_{loadloop}\times c_{loadloop})\times f_{loadloop}\times (T_{loadloopin}-T_{loadloopout})$$

$Q_{loadloop}$=instantaneous rate of heat transfer to the heat pump load side of the flow interface (Btu/hr)
D is the density of the fluid flowing through the loops (lb/ft$^3$);
c is the specific heat of the fluid in the loops (Btu/lb/° F.);
$f_{loadloop}$ is the fluid flow rate in the heat pump load loop (gallons/minute);

T is the temperature (° F.) at the inlet to, or the outlet from, the flow interface in the heat pump load loop; and 8.01 is a units constant; and raising and lowering the flow through the earth loop by varying the speed of the earthloop circulator by the data-receiver-and-controller, in a direction inverse to the value of $Q_{earthloop}$ relative to the value of $Ql_{loadloop}$, so as to continually move towards the equality of $Q_{loadloop}$ and $Q_{earthloop}$, as the heat pump load demand changes.

3. The method of claim 2, wherein the flow interface comprises a hydraulic separator between the earth loop and the load loop.

\* \* \* \* \*